July 15, 1930. N. M. BAKER 1,770,452
LENS CUTTER
Filed May 28, 1925 4 Sheets-Sheet 1

Inventor
Nelson M. Baker
By Harry H. Styll
Attorney

July 15, 1930.  N. M. BAKER  1,770,452

LENS CUTTER

Filed May 28, 1925  4 Sheets-Sheet 2

Inventor
Nelson M. Baker.
By Harry H. Styll
Attorney

July 15, 1930.    N. M. BAKER    1,770,452
LENS CUTTER
Filed May 28, 1925    4 Sheets-Sheet 4

Inventor
Nelson M. Baker
By Harry H. Styll.
Attorney

Patented July 15, 1930

1,770,452

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

LENS CUTTER

Application filed May 28, 1925. Serial No. 33,473.

This invention relates to new and useful improvements in cutters, and has particular reference to a novel and improved construction of machine particularly adapted for use in the cutting of ophthalmic lenses.

In the cutting of such lenses, it is customary to provide a machine of the character stated having a plurality of formers of different sizes and shapes, and wherein is provided means for imparting the shape of any one of the formers to a lens. It is well known that in order that a lens may be accurately cut it is very essential that the center of rotation thereof be properly positioned with respect to the lens holder, and this is ordinarily accomplished by aligning certain markers on the lens with corresponding markers on the lens holder. However, in the great majority of such machines, prior to the present invention, the formers have been mounted on a shaft positioned directly above the work table carrying the lens to be cut, which made it very difficult to align the above mentioned markers inasmuch as the operator could not look directly down upon the top of the lens but instead had to position the lens while looking at it from an angle so that while it may have appeared to the worker that the markers were in proper alignment, they were not.

Moreover, these machines have been ordinarily provided with a limited number of formers, usually four, and because of the large variety of standard shapes of lenses used, a more or less constant change of these formers was found necessary, which consequently resulted in the loss of much time and labor.

It is, therefore, one of the principal objects of the present invention to provide a machine of the character stated which is so constructed and arranged that the operator may look directly down on top of the lens, whereby the proper positioning thereof relative to the lens holder will be assured.

Another object of the present invention is the provision of a machine of this character having a sufficient number of formers in order that a large variety, both of sizes and shapes, of lenses may be cut without the necessity of constantly changing formers.

Another object of the invention is to provide such a machine wherein the formers are mounted on the same spindle, carrying the lens to be cut.

Another object is to provide such a machine having a plurality of formers mounted in the base member thereof and positioned beneath the lens holder.

Another object is to provide such a machine which will serve to satisfactorily cut lenses of various curvatures and wherein the cutting mechanism is adjustable so as to present the cutting point substantially normal to said lens, whereby the best cutting action is effected.

Another object is the provision in connection with a machine having a plurality of formers of novel and improved mechanism for selectively presenting the contact shoe for engagement with the desired former.

A further object is to provide such a machine wherein the contact shoe will, at all times, be held firmly against the former and wherein is provided means for adjusting the tension of the holding means.

A still further object of the invention is the provision of former engaging mechanism which shall insure absolute reproduction of the shape of former employed, and which shall at the same time insure proper tracking of the diamond when following either elliptical or odd shapes.

Other objects and advantages of the present invention should be readily apparent by reference to the following specification taken in connection with the accompanying drawings.

In the drawings forming a part of this application.

Figure 7:
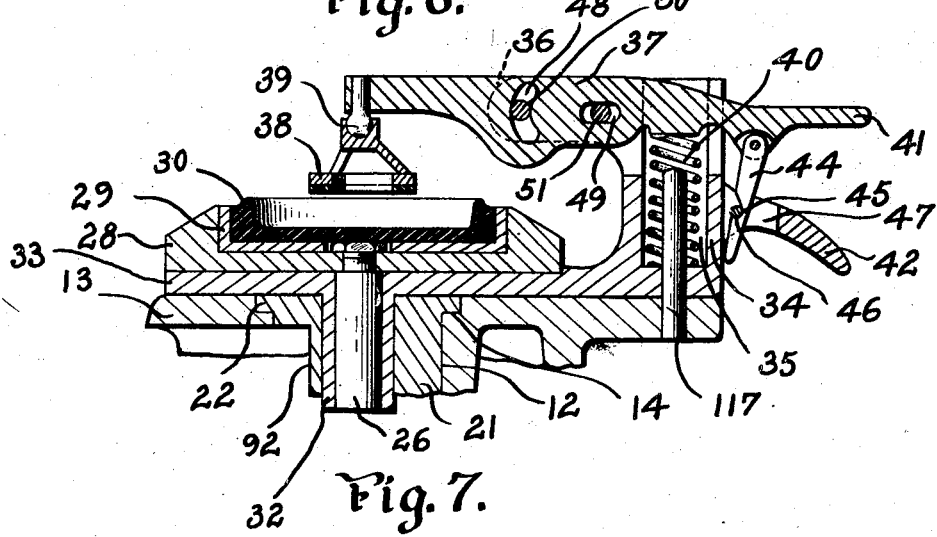
Figure 7 is a detail sectional view on line 7—7 of Figure 4.

Referring more particularly to the accompanying drawings, wherein like characters of reference denote corresponding parts throughout the several views, it will be noted that in carrying the invention into practice there is employed a hollow base member 10 being cut away at one side, as indicated at 11, and having an opening 12 in the top 13 thereof, said opening 12 being counterbored to form the circumferential shoulder 14. See Fig. 7. Positioned within the base member 10, adjacent the bottom thereof is a bearing 15, and rotatably mounted within this bearing is a bushing 16 formed integrally with the bevel gear 17, which is rotated by means of the bevel driving pinion 18 in constant mesh therewith, said pinion being mounted on the inner end of the shaft 19, which extends through the side wall of the base member and to the outer end of which is connected the operating handle 20. Inserted within the opening 12 is a bushing 21 having a circumferential flange 22 which rests upon the shoulder 14, whereby to retain said bushing in position. The bushings 16 and 21 are arranged in vertical alignment with each other and provide bearings for the vertical spindle 23, to which is keyed an elongated bushing 24 on which is mounted a plurality of formers 25. The upper portion of the spindle is reduced, as indicated at 26, to form the resultant shoulder 27, said spindle extending upwardly beyond the base member 10 and having secured to its outer end the usual supporting table 28, within which is positioned a removable plate 29 carrying the rubber bed 30 on and against which is arranged to be clamped, the lens 31.

Encircling the reduced portion 26 of the spindle 23 and resting upon the shoulder 27, is a bearing 32, formed integrally with the circular plate 33, which extends outwardly beyond the base member 10 and is formed into a vertical socket member 34 having a recess 35. Formed at the upper end of the socket member 34 are the inwardly extending arms 36 spaced a sufficient distance to hold between them a lever 37, which extends inwardly and centrally of the base member 10 and carries the lens clamp 38 which is connected therewith by a universal ball and socket joint 39 to permit the clamp to automatically seat itself on the lens when it is lowered. Arranged within the recess 35 and bearing against the lever 37 is a spring 40 which tends to force the outer end of the lever 37 carrying the lens clamp 38 downwardly against and upon the lens 31. The lever 37 is extended backwardly and flattened sufficiently to form a convenient thumb holding surface 41, a corresponding finger rest 42 being formed integrally with the recessed portion 34, whereby to facilitate the raising of the clamp 38 against the compression of the spring 40. In order to hold the clamp 38 away from the lens to permit the latter being removed or positioned, there is pivoted to the thumb holding surface 41 a latch 44 which is provided with a notch 45 arranged to engage with a transverse pin 46 positioned in a slot 47 in the finger rest 42. When it is desired to release the lens, the lever is oscillated on its pivot and the latch 44 snapped into position so that the notch 45 will engage with the pin 46 and retain the clamp 38 removed from the lens. Cut in the lever 37 are a pair of cam paths 48 and 49 receiving the bolts 50 and 51, respectively, which are held rigidly in the spaced arms 36 at either side of the lever and permit the pivotal action thereof during the raising and lowering of the lens clamp 38. These cam paths and the bolts engaging the same are so formed, constructed and arranged as to give a forward and backward thrust or movement to the entire lever 37, in order to retain the clamp 38 in alignment with the center of rotation of the lens during the clamping thereof regardless of the curvature of the lens. The bushing 16 is provided with a key 52, which operates within a groove 53 formed in the spindle 23 so that while the spindle may be raised and lowered independently of the gear 17, it is at all times rotatable therewith.

Positioned at one side of the cut away portion 11 are the vertically aligned bearings 54 and 55, in which is fixed the shaft 56. Pivotally mounted on the shaft, between the bearings, is a bracket member 57 having the vertically spaced arms 58 and 59 in which are swivelled the arms 60 and 61 of the support 62. The upper end portion of the support extends above the top of the base member 10 and is directed inwardly as at 63, and pivotally secured to the free end of this inwardly directed portion, as at 64 is the cutting mechanism designated generally by the reference character 65, and which includes the base portion 66 and the arms 67 extending in a direction at substantially right angles to the base portion and carrying the cutting diamond 68. When cutting a lens it is very essential that the diamond be positioned as near at right angles thereto at the point of contact as is possible and because of the various curvatures of lenses, it is necessary that the angle of the diamond be capable of various adjustments. In order that this may be accomplished in the present invention, the base portion 66 of the cutter mechanism is provided with a longitudinal recess 69 in which is arranged a small spring pressed plunger 70 which is adapted for selective engagement with any one of the openings 71 formed in the semi-circular shoulder 72 carried by the support 62. To facilitate this adjusting operation there is secured to the plunger 70 a thumb piece 73 which extends through and operates within a slot 74 formed in the base portion 66 so that when it is desired to vary the angle of the diamond, the plunger 70 may be forced out of the recess 69 against the action of the spring 75 contained therein, and the entire cutter mechanism swung on its pivot 64 until the proper angle of the diamond has been secured, whereupon the plunger is released and permitted to engage within the adjacent opening, whereby to retain said diamond at the desired angle.

Carried by the support 62 at a point approximately intermediate the top and bottom of the base member 10, is a housing 76 having the rearward extension 77 which is slidably received within the transverse groove 78 formed in the support 62. Mounted within the housing 76 is a segmental gear wheel 79 which meshes with the vertical rack bar 80 arranged within the guide way 81 so that as the segmental gear wheel is rotated, the rack bar is arranged to be either raised or lowered.

Figure 1:
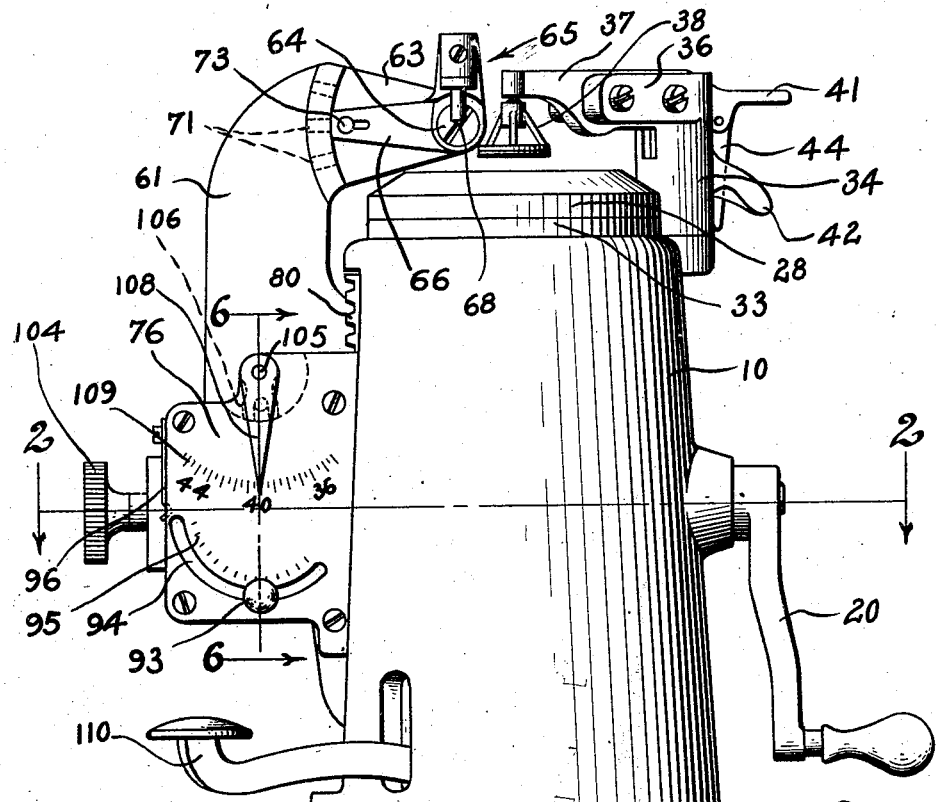
Figure 1 is a front elevation of a machine constructed in accordance with the present invention.
Figure 2:
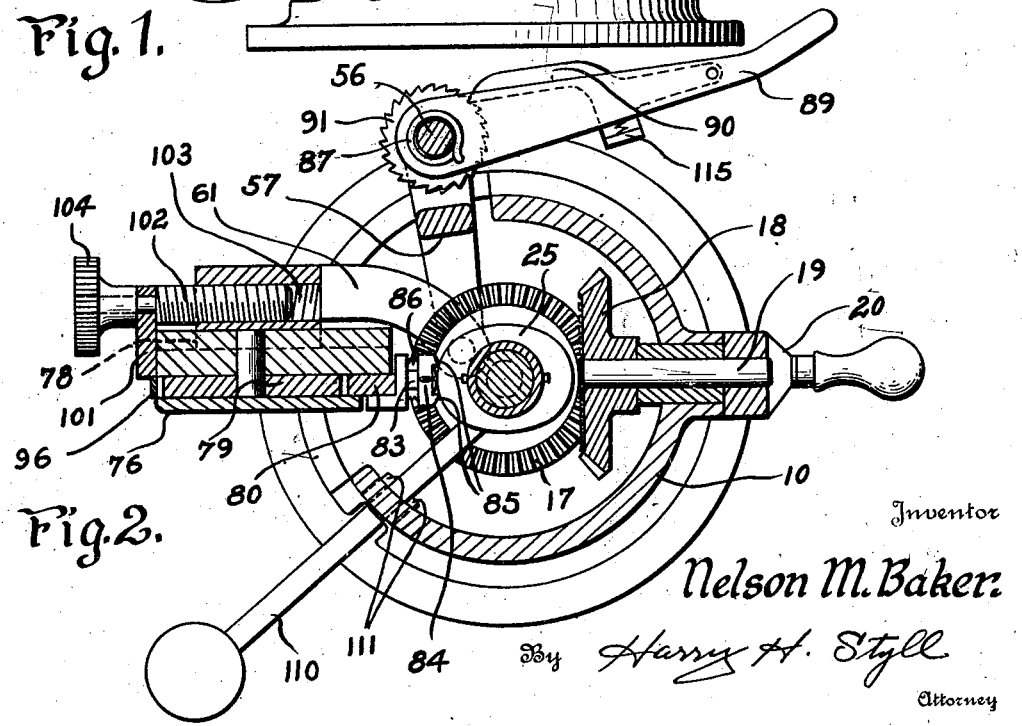
Figure 2 is a horizontal sectional view taken on line 2—2 of Figure 1.
Figure 3:
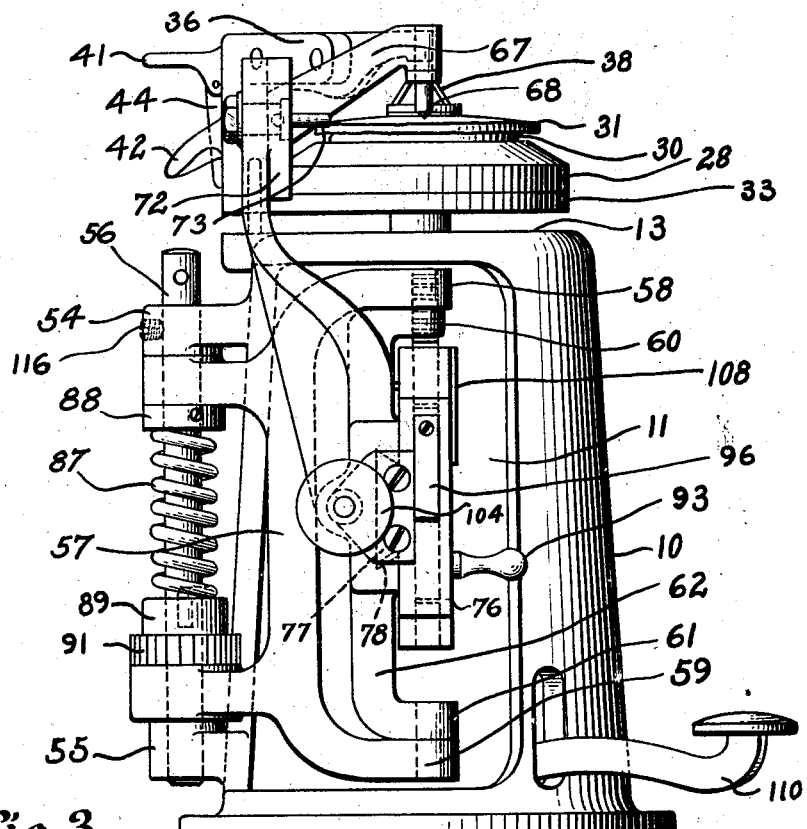
Figure 3 is a side elevation of the machine.
Figure 4:
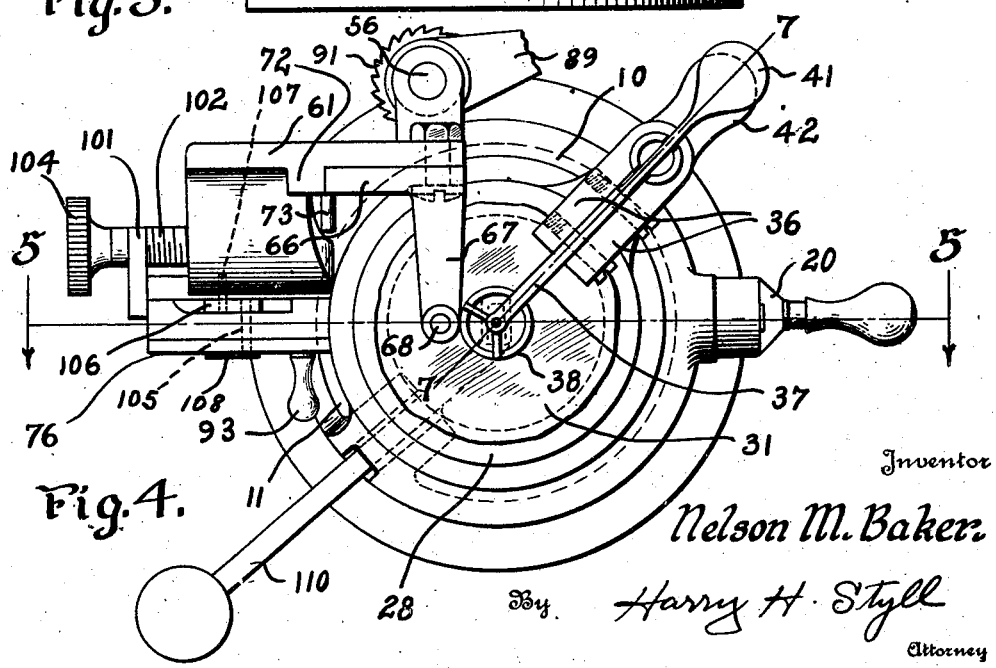
Figure 4 is a top plan view thereof.
Figure 5:
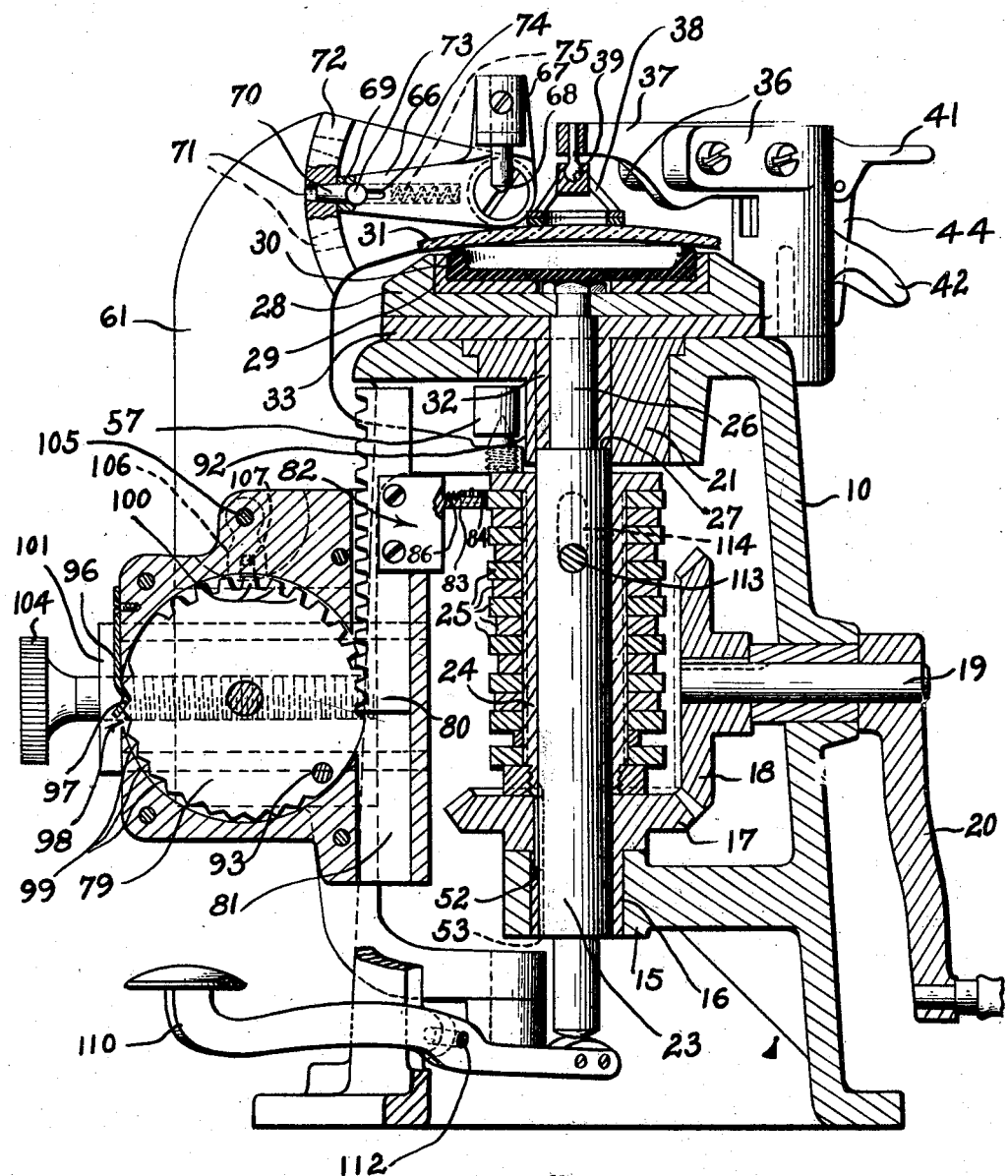
Figure 5 is a vertical sectional view on the line 5—5 of Figure 4.
Figure 6:
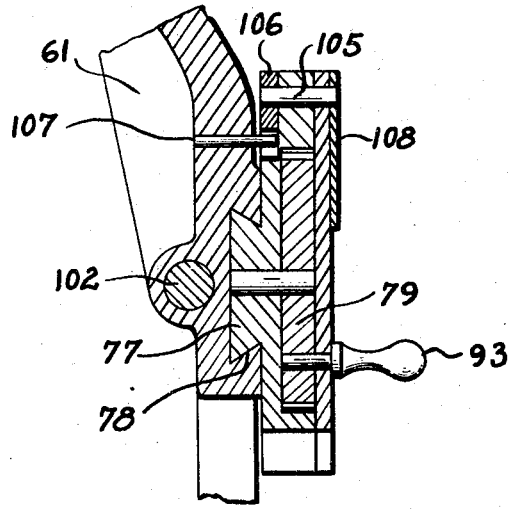
Figure 6 is a detail sectional view on line 6—6 of Figure 1.

Secured to the rack bar 80 is the former shoe 82, comprising the stationary contact plate 83 arranged to be selectively positioned adjacent the formers 25, as the said rack bar 80 is raised or lowered. Mounted upon the plate 83 is a slide 84 having the spaced contact jaws 85, see Fig. 2, which also engage with said formers. The slide 84 is actuated along the plate 83 in the direction of the formers by means of the springs 86 which give a light pressure so that the contact jaws will at all times be held against the formers. This construction is particularly useful in cutting octagonal or other odd shapes in that as the point or corner of the former is received between the contact jaws 85 it will cause the support 62 to be twisted about on its pivot so that the diamond will immediately follow the new line of travel, thereby insuring proper angular cut.

The contact plate 83 is firmly held against the formers 25 through the instrumentality of the spring 87, which encircles the shaft 56 and has one end thereof secured to a collar 88 rigidly carried by said shaft, while the opposite end of said spring is secured to the lever 89 carrying the spring pressed pawl 90 engaging with the ratchet 91, secured to the bracket member 57, so that as the lever is operated to wind the spring 87, thereby increasing the tension thereof, the pawl 90 engaging with the ratchet 91, will tend to force the bracket member 57 and the support 62 toward the formers 25 so that the contact plate 83 will, at all times, be held in engagement therewith. The bushing 21 is cut away at one side, as indicated at 92, to permit the bracket member 57 to be received within the base member 10 so that the contact plate 83 may engage the said formers.

In order to rotate the segmental gear 79 whereby to raise or lower the rack bar 80 in order to position the contact plate 83 adjacent the desired former, there is secured to the segmental gear an operating pin 93 which projects through and operates within a semi-circular slot 94 formed in the front face of the housing 76 so that as the operating pin 93 is swung in either direction, the rack bar 80 carrying the former shoe 82 will be raised or lowered. The front face of the housing is graduated as at 95, to show the various shapes of formers employed, and any desired former can be easily located by simply moving the operating pin 93 in either direction until it registers with the graduation indicating the shape desired. In order to retain the contact plate adjacent the desired former, there is secured to the end face of the housing 76 a leaf spring 96 having a raised portion 97 which projects through an opening 98 in the housing and engages with the notches 99 formed on the segmental gear wheel at a point opposite to the teeth 100 thereof.

The desired size of a lens is obtained by moving the diamond toward or away from the center of rotation thereof and this is accomplished by means of a plate 101 secured to the end face of the housing and also to the adjusting screw 102, which screw is threaded within the transverse opening 103 formed in the support 62, the outer end of said screw having a thumb piece 104 to facilitate the operation thereof. Thus, after the contact plate 83 has been forced into engagement with the desired former by the operation of the lever 89, the screw 102 is rotated in either direction, which will cause the casting 61 carrying the diamond to be moved toward or away from the former, whereby to regulate the size of the lens.

Disposed through the upper end of the housing 76 is a transverse shaft 105, to the inner end of which is connected an inverted U-shaped member 106 between the legs of which is arranged to be received, the stationary pin 107 carried by the support 62, while to the outer end thereof is secured the indicator 108 and as the adjusting screw 102 is operated and the support 62 moved toward or away from the former, the shaft 105 will be rotated through the instrumentality of the pin 107, and the inverted U-shaped member 106 until the indicator 108 registers with any desired one of the suitable graduations 109, which will show the size being imparted to the lens.

In machines of this character, it is customary after the lens has been clamped in proper position to raise the same until it is engaged by the cutting diamond and in the present invention there is provided a lever 110 pivoted between the ears 111, as shown at 112, the inner end of which lever engages with the bottom of the spindle 23. Depression of the outer end of this lever acts to raise the spindle 23 and engage the lens 31 with the cutting diamond 68. It will be noted that as the spindle is raised, it carries with it the circular plate 33 having the clamping mechanism thereon. As the spindle is raised and lowered, however, the formers 25 remain stationary and this is accomplished through the medium of a pin 113 passing transversely through the spindle 23 and having its opposite ends engaged within recesses 114 formed at diametrically opposite points in the bushing 24.

In the operation of the machine, the lens 31 is first clamped against the rubber bed 30 in the manner hereinabove set forth, and the cutting diamond 68 adjusted to the desired angle according to the curvature of the lens, so that it will be as near normal at the point of contact with the lens as is possible, after which the segmental gear 79 is rotated to either raise or lower the rack bar 80 in order to position the contact plate 83 adjacent the desired former. The lever 89 is then operated to wind the spring 87 and after this has been done, the pawl 90 engaging with the ratchet 91 carried by the bracket member 57 will force the same into the base member 10 through the cut away portion 11 and cause the contact plate 83 to firmly engage with the selected former 25. The operating screw 102 is then rotated so as to move the support 62 carrying the diamond 68 toward or away from the formers, whereby to determine the size of the lens which will be shown by the position of the indicator 108 relative to the graduations 109. Depression on the outer end of the lever 110 will then act to raise the spindle 23, the lens 31 and the clamping mechanism until the lens engages with the diamond 68, and as it is held in engagement therewith, the operating handle 20 is rotated, which in turn will convey movement to the bevel gear 17 through the bevel driving pinion 18, and rotate the spindle 23, the lens 31 and the formers 25. As the contact plate 83 transgresses the former, the support 62 and the diamond 68 will be caused to move inwardly and outwardly whereby the shape of said former will be imparted to the lens.

When it is desired to withdraw the contact plate 83 from engagement with a former in order to position it adjacent another one of a different shape, the operator need only press upon the thumb piece 115, whereby the pawl 90 will be disengaged from the ratchet 91 and the lever 89 permitted to be moved in a direction to unwind the spring 87. When the pressure of the spring is released from the bracket member 57, the support 62 carrying the former shoe 82 can be pulled outwardly and away from the formers 25, and the segmental gear wheel 79 moved in either direction by means of the operating pin 93 whereby to move the rack bar 80 upwardly or downwardly to position the contact plate 83 adjacent another former.

If, when the lever 89 is operated to wind the spring 87, the tension thereof is not sufficient to hold the contact plate 83 firmly in engagement with the formers, the set screw 116 carried by the shaft 56 may be loosened and the said shaft rotated to wind the spring until a sufficient tension has been secured after which the said set screw is tightened and the lever 89 then operated in the usual manner.

The circular plate 34 is held in proper position with respect to the base member 10, and against rotation during the rotation of the spindle 23 and the lens 31 by means of a vertical pin 117 which is carried by the base member 10 and received within the socket member 35.

From the above it will be readily appreciated that there has been provided a lens cutter which will perform all of the functions and accomplish all of the objects claimed and while there has been shown and described a preferred embodiment of the invention, it will be understood that modifications in the specific details of construction may be found necessary and that any such changes as fall within the scope of the appended claims, may be made without departing from or exceeding the spirit of the invention.

What is claimed is:

1. A lens cutter of the character described, including a lens carrying spindle, a member mounted on said spindle and having a plurality of lens shapes, said spindle arranged to be moved independently of said member, and a movable contact plate arranged for selective engagement with any one of said lens shapes.

2. A lens cutter of the character described, including a lens carrying spindle, a plurality of formers mounted on said spindle, said spindle being arranged to be moved independently of the formers, a single contact plate, and means for moving the contact plate to position it adjacent any desired former.

3. A lens cutter of the character described, including a base member, a lens holding spindle within said base member, a member having a plurality of lens shapes mounted on said spindle, said spindle being arranged to be moved longitudinally independently of the lens shape member, a swinging member carried by the base member, a movable contact plate arranged for selective engagement with the said lens shape member, lens cutting mechanism carried by said swinging member and means also carried by the swinging member adapted to coact with the contact plate for moving the contact plate toward or away from the base member.

4. A lens cutter of the character described, including a base member, a spindle mounted within said base member and arranged to support a lens outwardly thereof, a member having a plurality of lens shapes carried by said spindle, a support positioned adjacent said base member, a contact plate carried by said support, means for adjusting said contact plate to position it for contact with any desired lens shape, a lens cutter carried by said support, and means for adjusting the angle of said cutter relative to the lens.

5. A lens cutter of the character described, including a base member, a lens holding spindle mounted within said base member and arranged to support a lens outwardly thereof, a plurality of formers carried by said spindle, said spindle being adapted to be moved longitudinally independently of said formers, a swinging member carried by said base member and arranged to be swung outwardly and away therefrom, a contact plate carried by said swinging member, means for raising and lowering said contact plate to position it for contact with any desired former, means for holding said plate in engagement with the former, a cutter carried by said swinging member, means for adjusting the angle of said cutter with respect to the surface of a lens, and means for moving said cutter toward or away from the center of the lens.

6. A lens cutter of the character described, including a spindle, a member mounted on said spindle and having a plurality of lens shapes, said spindle being arranged to be moved longitudinally independently of said member, a swinging member positioned adjacent said spindle, a longitudinally movable contact plate carried by said swinging member and arranged for selective engagement with any one of said lens shapes, cutting mechanism carried by said swinging member, and means also carried by the swinging member for moving the cutting mechanism toward or away from the center of the lens.

7. In a lens cutter of the character described, the combination with a member having a plurality of lens shapes, of a rack bar positioned adjacent said member, a contact plate carried by said bar, and a gear wheel meshing with said rack bar and arranged upon rotation to move the same longitudinally, whereby to position said contact plate adjacent any desired lens shape.

8. In a lens cutter of the character described, a former, a bracket member, a contact plate carried by the bracket member and arranged to engage said former, a ratchet secured to said bracket member, a pawl, and spring means for holding said pawl engaged with said ratchet whereby to force the bracket member toward the former and hold the contact plate in engagement therewith.

9. In a lens cutter of the character described, a shaft, a bracket member pivotally mounted on said shaft, a former engaging contact plate carried by said bracket member, a ratchet also carried by said bracket member, a lever carried by the shaft, a pawl carried by said lever, and a coil spring encircling said shaft and having one end fixed thereto while the other end thereof is secured to said lever whereby to hold the pawl in engagement with said ratchet and the contact plate against a former.

10. In a device of the character described, a rotatable lens carrying spindle, a member having a plurality of lens shapes mounted on the spindle, means for moving the spindle longitudinally independently of the lens shape member, a contact member, and means for moving the contact member to engage any one of the lens shapes.

11. In a device of the character described, a member having a plurality of lens shapes, a reciprocating member positioned adjacent said member, a contact member carried by the reciprocating member, and means inter-acting with the reciprocating member to move the reciprocating means longitudinally to position the contact member in engagement with any desired lens shape.

12. In a device of the character described, a support, an arbor on the support, a plurality of lens shapes on the arbor, a bracket pivoted on the support on an axis parallel to the axis of the arbor, a second bracket pivoted to the first bracket on an axis parallel to the axis of the arbor, a contact on the second bracket adapted to engage the lens shapes on the arbor, means to move the contact on the second bracket towards and from the lens shapes, means to move the contact parallel to the axis of the arbor, and resilient means to hold the contact against the lens shapes.

13. In a device of the character described, a support, an arbor on the support, a lens shape on the arbor, a bracket pivoted on the support on an axis parallel to the axis of the arbor, a second bracket pivoted to the first bracket on an axis parallel to the axis of the arbor, a contact on the second bracket adapted to engage the lens shape, resilient means to hold the contact against the lens shape, and ratchet means to regulate the tension of the resilient means.

14. In a device of the character described, a support, an arbor on the support, a lens shape on the arbor, a swinging arm pivoted on the support on an axis parallel to the axis of the arbor, a second swinging arm pivoted to the first swinging arm on an axis parallel to the axis of the arbor, a contact on the second swinging arm to engage the lens shape, a lens seat on the support aligned with the arbor, an extension arm pivoted on the second swinging arm and overhanging the lens seat, and a lens cutter on the extension overhanging arm.

15. In a lens cutter, a support, a spindle in the support having a lens rest thereon, a swinging arm pivoted to the support on an axis parallel to the axis of the spindle, a second swinging arm pivoted to the first swinging arm on an axis parallel to the spindle, an extension arm pivoted to the second swinging arm on an axis transverse to the axis of the spindle and extending over the lens rest, means to lock the extension arm in desired angular position with respect to the lens rest, a cutting element on the pivoted arm, and means to rotate the spindle whereby the lens is rotated against the cutting element.

16. In a lens cutter, a support, a spindle in the support having a lens rest thereon, a plurality of lens shapes on the spindle, a swinging arm pivoted to the support on an axis parallel to the axis of the spindle, a second swinging arm pivoted to the first swinging arm on an axis parallel with the spindle, an extension arm pivoted to the second swinging arm on an axis transverse to the axis of the spindle and extending over the lens rest, means to lock the extension arm in desired angular position with regard to the lens rest, a cutting element on the extension arm, a contact on the second arm, means to engage the contact with the desired lens shape, and means to rotate the spindle whereby the lens is rotated against the cutting element.

NELSON M. BAKER.